United States Patent [19]

Jamzadeh

[11] Patent Number: 5,369,426
[45] Date of Patent: Nov. 29, 1994

[54] METHOD AND APPARATUS FOR OPTIMIZATION OF PRODUCTIVITY THROUGH THE SYNCHRONIZATION OF A SCANNER AND PRINTER USING A PRE-SCAN

[75] Inventor: Feraydoon S. Jamzadeh, Fairport, N.Y.

[73] Assignee: Eastman Kodak Company, Rochester, N.Y.

[21] Appl. No.: 40,700

[22] Filed: Mar. 31, 1993

[51] Int. Cl.$^5$ .................. G01D 15/00; G03F 3/08; G03G 15/01
[52] U.S. Cl. .................. 346/157; 355/326 R
[58] Field of Search .................. 355/326 R, 327; 346/157, 160

[56] References Cited

U.S. PATENT DOCUMENTS

| | | | |
|---|---|---|---|
| 4,323,919 | 4/1982 | Fujii et al. | 358/75 |
| 4,378,566 | 3/1983 | Tsukamura | 358/75 |
| 4,538,905 | 9/1985 | Griego et al. | 355/14 |
| 4,605,298 | 8/1986 | Russel et al. | 355/3 |
| 4,705,386 | 11/1987 | Ogita et al. | 355/4 |
| 4,734,760 | 3/1988 | Futaki | 358/75 |
| 4,796,054 | 1/1989 | Maeno et al. | 355/8 |
| 4,872,037 | 10/1989 | Kasahara et al. | 355/271 |
| 5,016,056 | 5/1991 | Johnson et al. | 355/279 |
| 5,021,829 | 6/1991 | Johnson et al. | 355/213 |
| 5,021,835 | 6/1991 | Johnson | 355/271 |
| 5,040,026 | 8/1991 | Jamzadeh et al. | 355/271 |
| 5,070,374 | 12/1991 | Murahashi et al. | 355/326 |
| 5,175,628 | 12/1992 | Jamzadeh et al. | 358/300 |

*Primary Examiner*—Fred L. Braun
*Attorney, Agent, or Firm*—Dennis R. Arndt

[57] ABSTRACT

In an electronic color printing process in which an array of images from respective frames of a filmstrip or the like is provided on print receiver sheets or alternative storage or alternative storage media from information signals representing image information, producing prints from the array of images. The prints are produced by pre-scanning, at low resolution, an array of images contained on respective forms of a filmstrip or the like. Information data obtained during a low resolution pre-scanning of at least the number of printable images and frame location is used to determine the length of time required to complete a high resolution scan and provides a first signal indicating when images can be written. A second signal is generated in response to the position of the movable image member. A logic and control unit uses the first and second signals to control the position of the movable image member by controlling the position of the image receiving portion of the movable image member so that the image receiving portion is positioned to receive images from the image writer.

17 Claims, 6 Drawing Sheets

FIG. I

METHOD AND APPARATUS FOR OPTIMIZATION OF PRODUCTIVITY THROUGH THE SYNCHRONIZATION OF A SCANNER AND PRINTER USING A PRE-SCAN

TECHNICAL FIELD

This invention relates in general to electronic color printing of images contained in a filmstrip or the like, and more particularly, to the optimization of productivity through synchronization of the scanner and printer using a pre-scan.

BACKGROUND ART

In conventional color electrophotography, a series of electrostatic images are created on an image member. They are toned with different color toners and then transferred in registration to a receiving surface to create a multicolor toner image. Typically, the receiving surface is a receiving sheet of paper of similar material which is then secured around the periphery of a transfer drum. The transfer drum is rotated in contact or near contact with an image member to repeatedly bring the receiving sheet into transfer relation with the consecutive images to overlay them in registration.

It is also known to transfer a series of color toner images in registration directly to the periphery of the transfer drum to create the multicolor image on the surface from which it is transferred in a single step to a receiving sheet.

As color toners get finer, for example, less than 10 microns, especially less than 3.5 microns, higher resolution becomes possible, even approaching that of conventional silver halide photography.

Such apparatus operates to sequentially scan each of the image frames on the original filmstrip (e.g., a 35 mm color negative filmstrip) and produce, by an electrophotographic printing process, full-color prints on a non-photosensitive photosensitive print-receiver sheet, such as a sheet of paper having a thermoplastic coating. The electrophotographic process involves the steps of forming a set of different color-separated toner images (e.g., cyan, magenta and yellow toner images) on a reusable photoconductive recording element, one set for each original image frame, and transferring such images in registration to the print receiver sheet.

To facilitate sheet handling in the above apparatus, as well as to enhance the efficiency of the overall print-making process, each print receiver sheet is considerably larger in size than the commonly desired sizes of photographic prints. Thus, it is disclosed that several color prints be formed on each receiver sheet. For example, assuming the receiver sheet having a size (in inches) of 12×18, it is disclosed that nine 4×6 prints be produced on the receiver sheet in a 3-by-3, 2-dimensional array. This 3-by-3 array, sometimes referred to as "9-up" format, would be a desirable format due to the current popularity of photographic prints of the 4×6 inch size. In the event larger prints (e.g., 5×7 inch) are desired, four of such prints may be formed on a receiver sheet of this size, in a 2-by-2, or "4-up", format. Upon forming multiple images on a receiver sheet, the receiver sheet is cut to revive the smaller format prints or "snapshots".

To produce full color prints by any of the various non-photographic techniques, e.g., by electrophotographic, thermal/dye-sublimation and ink jet technology, it is necessary to sequentially record a series of color-separated images, viz. cyan, magenta and yellow images, on an image-recording member. These images are either directly recorded, in registration, on the ultimate print-receiving medium, as is the case for thermal and ink-jet recording, or, as indicated above in the case of electrophotographic recording systems, recorded on a reusable recording element from which the images can be transferred, in registration, to the print-receiving medium. In either case, information required to produce these color-separated images can be provided by scanning a color negative filmstrip, one frame at a time and pixel-by-pixel, with an electronic scanning device, e.g., a color-responsive charge-coupled device (CCD). Such scanning devices provide a set of color-separated signals, each of such signals representing the spectral content of the photographically recorded image at three different wavelength regions, e.g., the red (R), green (G), and blue (B) spectral regions. Alternatively, the color-separated R, G and B signals can be computer-generated or read off from a ROM (e.g., a compact disc).

In conventional photographic photo finishing, the print medium takes the form of a strip of photosensitive paper, and multicolor images are printed directly thereon in the same order as they appear on the filmstrip. A strip format is performed through the photographic print medium since it is much easier to advance an elongated strip through the chemical baths required to develop the latent images formed thereon than it is to advance sheet material through the processing baths. Moreover, since multiple color-separated images can be printed simultaneously and in registration on a photographic emulsion, it is possible to use the output of a film scanner directly to control the exposure source of the printer with little or no need to buffer or store the scanner output.

But in the case of non-photographic photofinishing, where multiple full-color images are to be formed on a single sheet of printing material, there is a need to store relatively vast quantities of colored image information before the printing of the first, multiframe, color-separated image frame can begin. For example, before the first color-separated image of a "9-up" format can be formed on the photoconductive recording element of the electrophotographic printer mentioned above, it is necessary to store 27 color-separated images (i.e., 9 images times 3 color separations each).

Electronic printing, such as electrophotographic reproduction, by an apparatus performing photofinishing of images contained in an original filmstrip or the like (e.g., a 35 mm color negative filmstrip) has been shown and described in U.S. Pat. No. 5,040,026, issued Aug. 13, 1991 in the name of Jamzadeh et al. Such apparatus operates to sequentially scan the respective image frames of an original filmstrip and produce, by an electrophotographic process, full color prints on a non-photosensitive print receiver sheet. In the electrophotographic process, a set of color separation marking particle images (e.g., cyan, magenta, and yellow) are formed on a reusable photoconductive recording member, one set for each of the respective original image frames on the filmstrip. The set of color separations marking particle images are transferred and registered to a print receiver sheet to form the desired full color print.

It has been found that when multiple prints are produced on a receiver sheet in the above-described manner, there are certain conditions imposed on the electronic printing process which may have an adverse effect on the quality and quantity of the completed prints. With the electronic color printing of images, it is desirable to have the process functions thereof optimized, based on information data, of images to be printed, there may be obtained during a low resolution pre-scan of said images. Prints are produced by pre-scanning, at low resolution, an array of images contained on respective frames of a filmstrip or the like. Information data, obtained during low resolution pre-scanning of at least the scene content of the respective images, are stored and operating parameters based on the stored information data are calculated to determine required process functions for the electronic printing process. Based on the determined required process functions, for the electronic printing process are set in a manner to optimize the process.

U.S. Pat. No. 4,705,386 describes a color copying machine that includes a scanning device for applying illumination onto a color original to effect a scanning operation. Because the yellow, magenta and cyan tones are sequentially transferred onto the single record sheet to achieve a color copy, each toner image must be transferred accurately to the same position on the second sheet for a good quality copy. This requires that the drive mechanism for the scan system, the photoconductive drum and the transfer drum must be operated in synchronism with one another. The photoconductive drum and the transfer drum are connected together through a gearing with little backlash so that they are rotated together with each other. The drive mechanism for the scan system comprises a servomotor which has a high responsiveness in speed control. With such drive systems, the peripheral length L of the transfer drum determines that one set of scanning and retrace (i.e., scanning back) with respect to a second sheet is for the maximum size, A3-size which is effected per one revolution of the transfer drum.

Accordingly, it can be seen that the invention improves copier productivity only when dealing with sheets smaller than the maximum size. The scanner retrace time is designed to match the non-image area of the drum (PC or transfer) when the maximum size sheet is used. Thus, it can be seen that for smaller sheets, this non-image gap increases and to impair productivity by retracing the scanner and begin exposing onto the PC-drum regardless of where it is; this is workable when a seamless drum is used. The extra gap on the transfer drum is compensated by speeding that drum.

It should be noted that unless the scanner as well as the drums are both sped up, the scanner retrace time matches the rotation of the non-image area of the drum for the small sheet. This requires that when dealing with the large sheets of paper, the scanner must retrace faster because the non-image gap area will be less (shorter). Such a productivity gain would require variable speed control on the scanner motor.

SUMMARY OF THE INVENTION

According to this invention, in an electronic color printing process in which images from an array of images from respective frames of a filmstrip or the like are provided on print receiver sheets or alternative storage media from information signals representing image information prints are produced by pre-scanning, at low resolution, an array of images contained on respective frames of the filmstrip or the like. Information dam, obtained during low resolution pre-scanning, of at least the number of printable images and proper frame location is used to determine the length of time required to complete a high resolution scan and ensure that the movable photoconductive member was properly positioned to begin writing of images upon completion of the high resolution scan.

The present invention provides an electronic color printing apparatus comprising a movable image member having an image receiving portion and a non-image receiving portion. An array of images contained on respective frames of film are pre-scanned at low resolution to provide a first signal. A second signal is generated in response to the position of the movable image member. Control means responsive to the first and second signals are used to control the position of the movable image member so that the image receiving portion is positioned to receive images from the image-forming means.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DETAILED DESCRIPTION OF THE INVENTION

Figure 1:
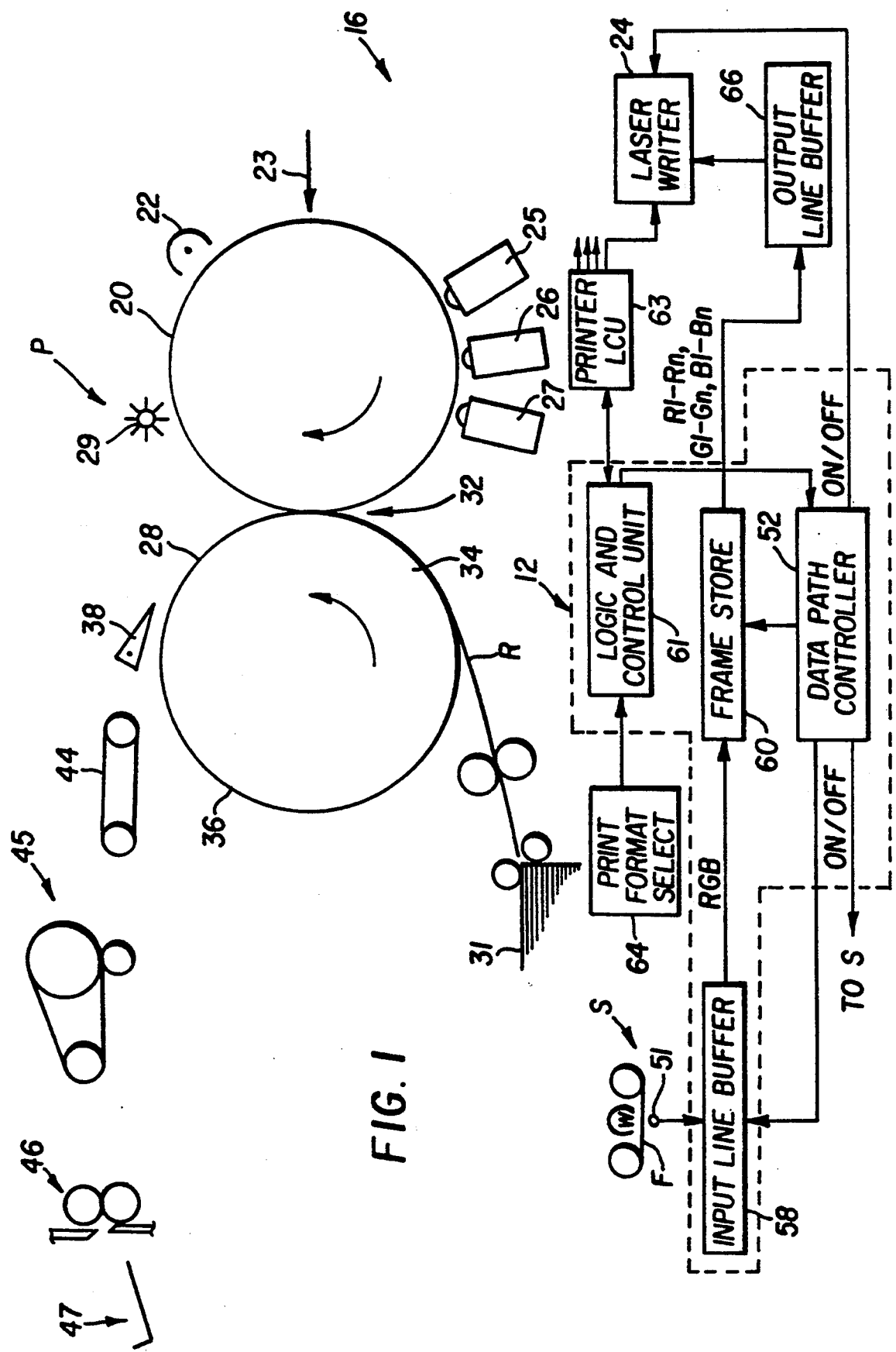
FIG. 1 is a generally schematic illustration of an exemplary electronic printing apparatus for carrying out the generation of prints, in accordance with this invention.

The following discussion of electronic printing is presented as general background to enable a full understanding of the instant invention. In order to utilize electronic printing for reproducing images from an array of multicolored images contained on a filmstrip or the like, the filmstrip must be scanned by an electronic color scanner which can conventionally include, for example, a color-responsive CCD (such as shown in U.S. Pat. Nos. 4,638,371 or 4,639,769). The scanner operates to produce, line-by-line and pixel-by-pixel (a pixel defined as a picture element), electronic signals representing the color content of each image contained in the scanned filmstrip. The signals are stored in a framestore (such as described in U.S. Pat. No. 5,175,628, issued Dec. 29, 1992 in the name of Jamzadeh et al) to enable subsequent driving of an exposure device and the electronic printer.

Electronically produced signals are also capable of being used for storage of an array of multicolored images (contained in an original filmstrip or the like) on alternative storage media such as a still video floppy or a video disc. Image regeneration devices are then required to readout the stored signals from the alternative storage media for display, for example, on a CRT or a standard television set. It is desirable to make a print on a single print receiver sheet for a complete array of filmstrip frame images so that such images are readily viewable. Such a single print receiver sheet bearing the complete array of filmstrip images is referred to as an "index print". That is, when providing prints for a filmstrip containing an array (i.e., series) of images, or when an array or images is stored on alternative storage media, it is advantageous to provide the customer with a single sheet (the index print) containing all of the images, included with the image prints or the alternative storage media.

The production of prints, including the index print, for an array of image frames contained on a filmstrip (or video disc) or the like is accomplished by pre-scanning, add low resolution, an array of multicolor images contained on a frame of a filmstrip or the like. Information data, contained during the low resolution pre-scan of the scene content of the respective image frames, and additional information data of at least one of where frames of the array are located on the filmstrip, what type of films trip is being scanned, the total number of frames on the filmstrip, and what are the conditions of each frame, are stored. Look-up-tables based on the stored information data are defined, and the stored information data is processed with the defined look-up-tables to produce prints of the array of multicolor images. Prints may thereafter be produced at high resolution, on respective print receiver sheets or at low resolution, as an index print, on a single print receiver sheet and the additional information data may be printed in association with the respective image prints on the individual print receiver sheets or on the index print.

The information data of at least the scene content of the images to be printed, obtained during the low resolution pre-scan of said images in the manner described above is additionally utilized to carry out the optimization of the electronic printing process. Referring to the accompanying drawings, FIG. 1 generally schematically illustrates an electrophotographic color printer capable of producing a plurality of multicolor image frames on a single print receiver sheet. The electrophotographic color printer, designated generally by the letter P, is basically of the type set forth in the aforementioned U.S. Pat. No. 5,040,026, and is described below in sufficient detail for a complete understanding of this invention. Of course, the color printer could alternatively be, for example, a color ink-jet printer, a color thermal printer, or any other suitable color electronic printer.

The electrophotographic color printer P comprises a reusable image recording element, for example, a photoconductive recording member in the form of a drum 20. The drum 20 is rotated by a motor, not shown, in a clockwise direction (as viewed in FIG. 1) past a series of processing stations, all of which are well known in the art. These stations include a charging station 22 which operates to uniformly charge the photoconductive surface of the drum 20, at an exposure station 23.

Exposure station 23 imagewise exposes the uniformly charged surface to create developable latent electrostatic images thereon. The exposure station may comprise a conventional LED printhead, an ion-depositing head, or as schematically shown, a laser writer 24.

As drum 20 rotates, the intensity of the output beam of laser writer 24 is modulated with color-separated image information data, whereby a series of latent electrostatic images are produced on the drum surface, each representing a color-separated image of the ultimately desired multicolor print. The series of electrostatic images on drum 20 is rendered visible with different color marking particles (e.g., cyan, magenta and yellow toner), by development stations 25, 26 and 27, respectively, to produce a series of related toner images. These color-separated toner images are then transferred in registration to the print receiver sheet R carried on the periphery of a transfer drum 28. The photoconductive drum 20 is subsequently cleaned at a cleaning station 29 and recycled through the electrophotographic image-forming process.

Print receiver sheets R are fed, seriatim, from a sheet supply 31 to an image-transfer station 32 defined by the nib between drum 20 and transfer drum 28. As each sheet approaches the image-transfer station 32, it is secured to the transfer drum 28 by vacuum means, gripping fingers or other suitable mechanism. For example, the leading edge of the sheet can be secured to the transfer drum by vacuum through a row of vacuum ports 34 and the trailing end by vacuum through a row of vacuum ports 36. During each rotation of the transfer drum, one color-separated toner image is transferred to a receiver sheet, for example, by heating the receiver sheet to a degree sufficient to soften the toner and tack the toner to the receiver sheet (see, for example, U.S. Pat. Nos. 4,968,578, issued Nov. 6, 1990, in the name of Light; 4,927,727, issued May 22, 1990 in the name of Rimai et al; and 5,021,835, issued Jun. 4, 1991 in the names of Johnson et al).

After the transfer drum 28 has made three (four) revolutions and three related color-separated toner images (plus a black image if a fourth revolution is employed) have been transferred, and superimposed registration, to the surface of a print receiver sheet R, the leading edge of the receiver sheet is stripped from the transfer drum 28 by stripping mechanism 38. The print receiver sheet R is transported by further rotation of the transfer drum 28 onto a sheet transport 44 which carries it to a fusing device 45 where the transferred images are fixed to the sheet by heat and/or pressure, for example. The print receiver sheet R is then cut by any suitable cutting mechanism 46 to provide a plurality of smaller prints each containing the reproduction from a single multicolor image frame. The resultant prints are collected in a tray 47 or more sophisticated print collecting device of any well known type.

Figure 3:
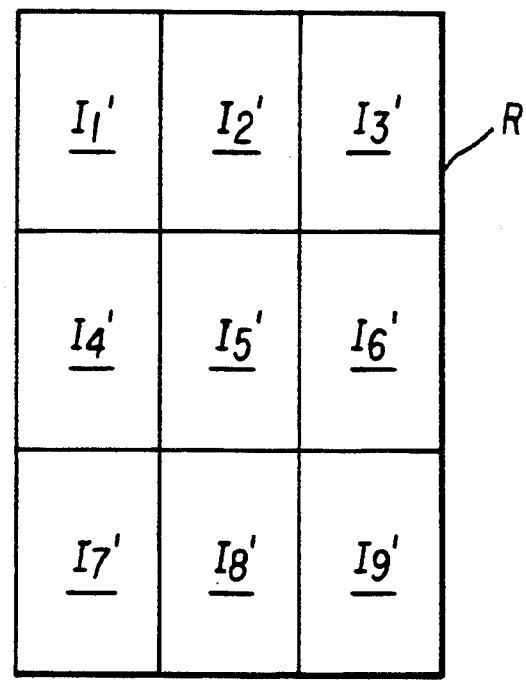
FIGS. 3 through 5 illustrate various formats in which multicolor image frames can be printed by the electronic printing apparatus of FIG. 1.
Figure 4:
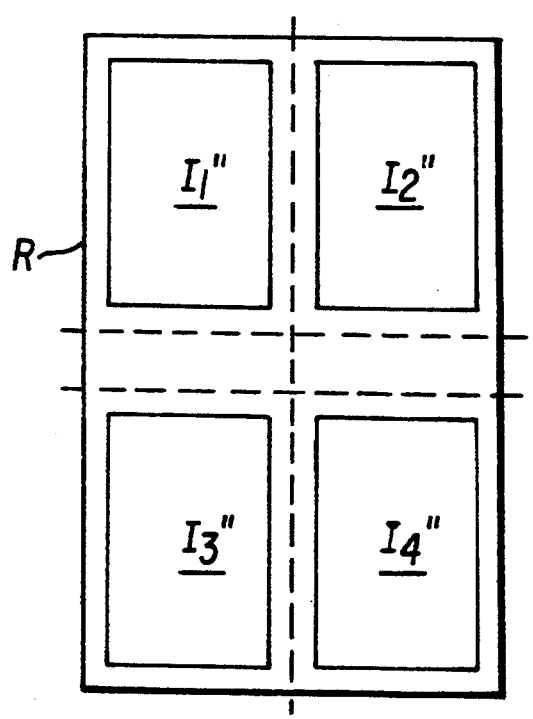
Figure 5:
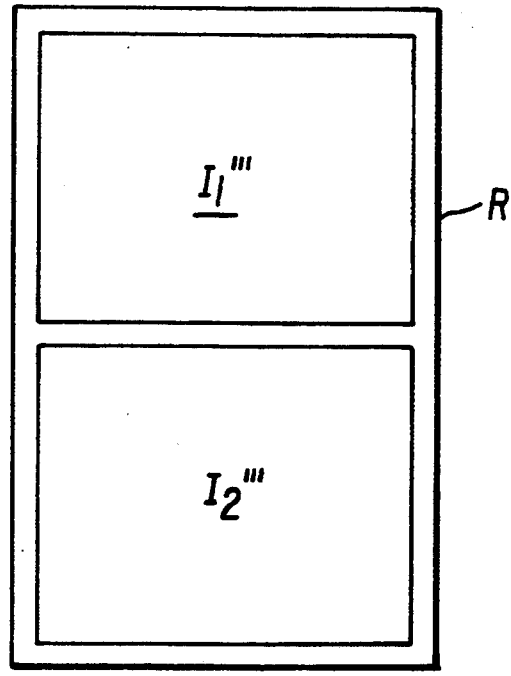

In the electrophotographic color printer P apparatus shown in FIG. 1, each print receiver sheet is of a relatively large size, for example, 12 inches by 18 inches. As shown in FIG. 3, such a print receiver sheet R can provide nine 4×6-inch print images ($I_1'$, $I_2'$, ... $I_9'$) exposed edge-to-edge with no waste. As mentioned above, this format is commonly referred to as the "9-up" format. The other print sizes will produce some waste with a 12×18-inch print receiver sheet. FIG. 4 illustrates a "4-up" format in which four 5×7-inch print images ($I_1''$, $I_2''$, ... $I_4'$) are formed on a 12×18-inch print receiver sheet. In FIG. 5, a "2-up" format is shown in which two 8×10-inch print images ($I_1'''$, $I_2'''$) are formed on a 12×18-print receiver sheet.

Figure 2:
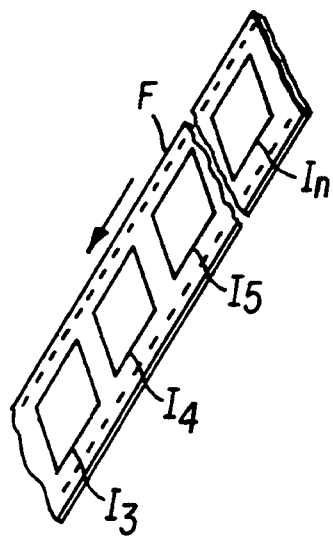
FIG. 2 is a view, in perspective, of a typical filmstrip containing an array of multicolor image frames.

The input signals to exposure station 23 are provided by conventional electronic color scanner S which includes a color-responsive CCD 51 (such as shown, for example, in aforementioned U.S. Pat. Nos. 4,638,371 and 4,639,769). Scanner S operates the scan in original multicolor image (e.g., as shown in FIG. 2 respective frames $I_1, I_2, \ldots I_n$ of a 35 mm color negative filmstrip) as the filmstrip F is moved past the scanner by well known drive mechanism (not shown). The scan is accomplished line-by-line and pixel-by-pixel, to produce three separated-signals, R, G and B representing the color content of each of the scanned image frames in three spectral regions, i.e., the red (R), green (G) and blue (B) spectral regions. These R, G and B color-separated signals are produced substantially simultaneously and, as they are produced, they are fed to a frame store 60 (discussed below) via an input line buffer 58 of an image data manager 12. The latter serves to buffer a few lines of image data to account for any electronic protocol (SCSI communications) latencies at the scanner/frame store interface, and look-up-table leads inside the filmstrip scanner S.

A logic and control unit (LCU) 61 operates through a data path controller 62 to control the flow of data into and out of the frame store 60 and manage the whereabouts of data in the frame store (i.e., provide a bookkeeping function). The LCU 61 also cooperates with a logic and control unit (LCU) 63 for the electrophotographic color printer P. The LCU 63 receives inputs from various portions of the electrophotographic color printer, including encoders (not shown) associated with the photoconductive and transfer drums (20 and 28, respectively), and transducers associated with the various processing stations to manage the timing of the entire printing process for such apparatus.

One of the inputs to the LCU 61 is from a print format selector 64, whereby an operator can choose any of several different print sizes. Based on the format selected, the LCU 61 instructs the data path controller 62 to extract both pixels from the frame store 60 in the appropriate format required to produce the appropriate format image on a print receiver sheet R. For example, if 4×6-inch prints (i.e., "snapshots") are desired, the LCU 61 instructs the data path controller to extract the stored pixels in the format required to produce the 9-up format on the print receiver sheet. Similarly, if 5×7-inch proofs are desired, the LCU 61 commands data path controller 62 to extract those prints from memory in the required format to print images in the 4-up format. In either case, the frame store 60 is readout in a sequence required to produce multiple color-separated images on the photoconductive drum 20. The data madout from the frame store 60 is applied to the laser writer 24 via an output line buffer 66 which serves to buffer a few lines of image information to account for latencies in the laser scanner/recording element interface, and data path image manipulation needs.

The low resolution pre-scan of the scene content of an image frame on the filmstrip F, accomplished in the order of 128×192 pixels, has been found sufficient to provide enough scene content data information to enable a recognizable print of an image from an array of image frames on a filmstrip therein. Also, such a low resolution pre-scan provides the necessary additional information data required for the LUT's needed for subsequent high resolution scanned printing of the filmstrip image frames. At this low resolution, the total data storage for an array of filmstrip image range is on the order of 20K bytes for each separation, well within the data storage capacity of commonly available, relatively inexpensive computer systems.

To utilize the data information obtained during the low resolution pre-scan for optimizing the printing process for an electronic color printer such as the printer P, information data particularly related to at least the scene content of the images to be reproduced are analyzed in the image data manager 12 by the LCU 61 to calculate the various operating parameters to determine the required process functions for the printer. Based on the determined required process functions, such functions are set to optimize the printing process. Particularly, the life of the photoconductive recording member may be maximized, marking particle consumption may be readily accommodated and substantially evenly accomplished, and the thermal requirements may be accurately predicted and efficiently provided for.

Figure 6:
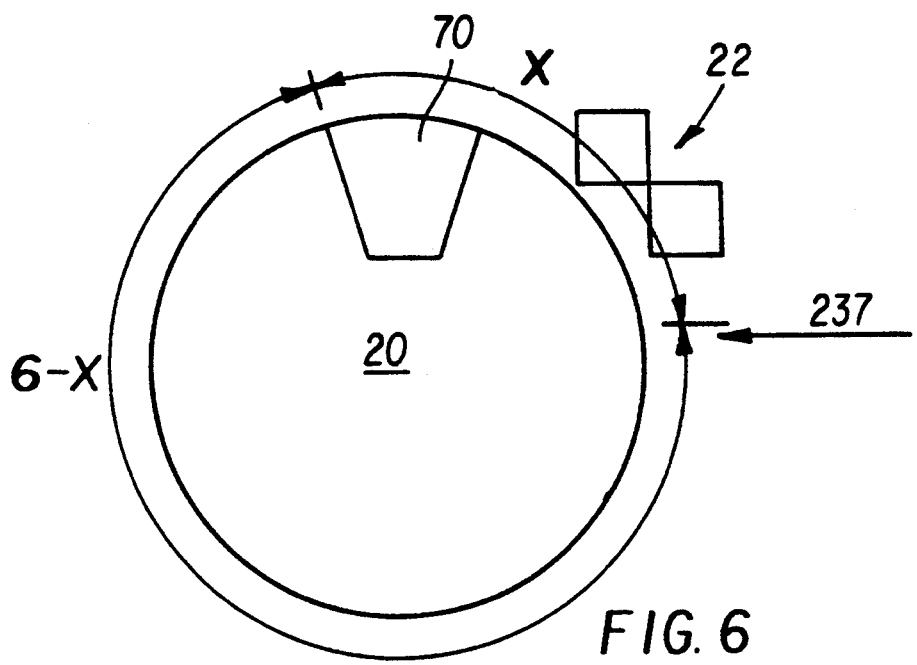
FIG. 6 illustrates the print engine at the 6-X second position where the position of the interframe prevents beginning the exposure because a complete image cannot be obtained.
Figure 7:
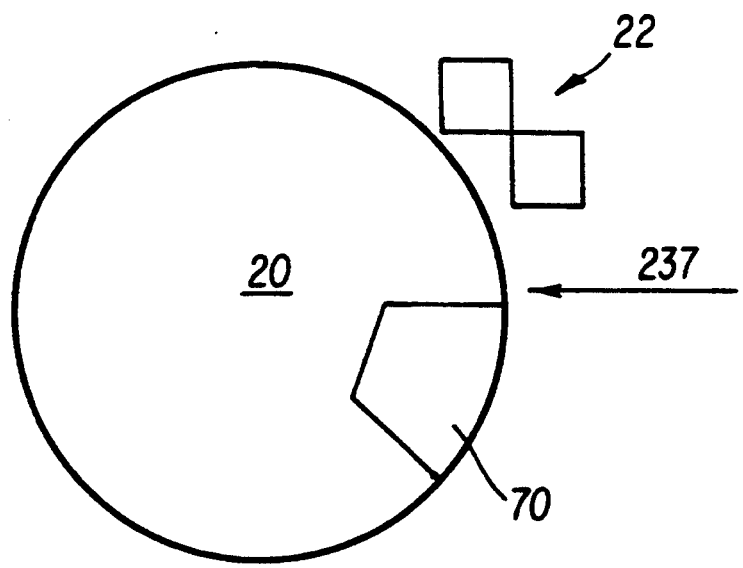
FIG. 7 illustrates the print engine at the "home" position which allows the exposure to begin ensuring that a complete image can be written.

In order to ensure proper performance of the thermal transfer process, the drums 20 and 28 are fairly large and are heated. Because it is important that the surface of the drums 20 and 28 are maintained at a very uniform temperature on their surfaces, the print engine P must be kept rotating t period of time, uniform heating of the drums would not be achieved. Because both of the drums 20 and 28 have a non-imaging interframe area 70 as shown in FIGS. 6 and 7 on photoconductor drum 20. This necessitates that in order to start imaging from an idle mode, the drums must reach a starting or "home" position. The interframe area 70 must pass under the charger 22 and clear the laser writer beam writing station 23 and then exposure can begin to place an image on the PC drum 20. Thus, it can be seen that in a worst case situation that the moment one wishes to begin imaging could be one full revolution of the drums 20 and 28 or six (6) seconds. This is referred to as the print engine latency period. It is the interest of the present invention to use the pre-scan stage and the information obtained therein to synchronize the rotation of the printer drums 20 and 28 to the scanner operation. Accordingly, as soon as enough frames have been scanned, the printer will begin exposing them immediately without any delay.

Figure 8:
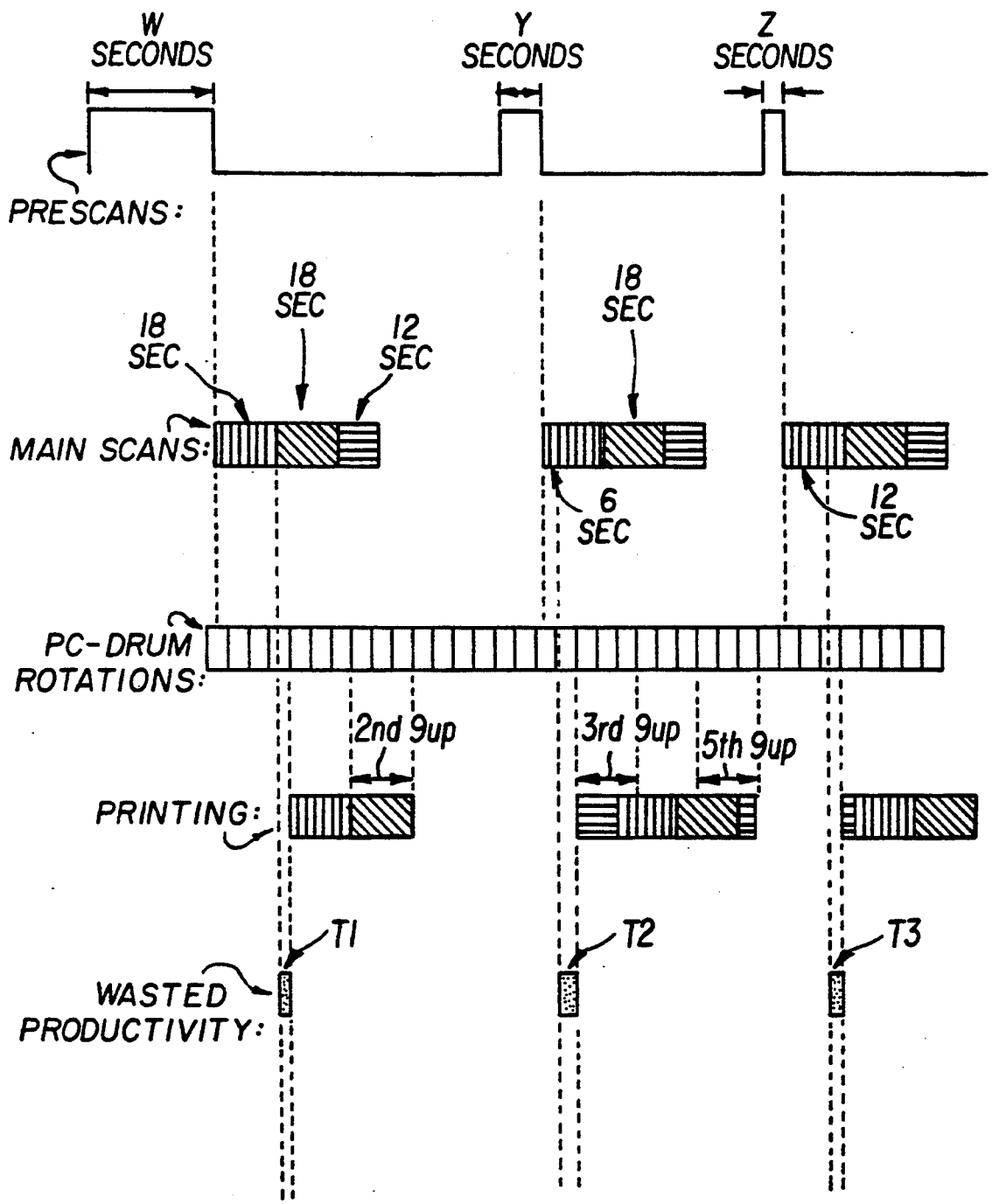
FIG. 8 is a timing diagram for a system without scanner and printer synchronization.

FIG. 8 shows a timing diagram for a system without scanner and printer synchronization. During the pre-scan period, the operator loads a new roll of film into the scanner, the scanner begins the pre-scan operation, IDM finds the locations of frames on the film and it determines the settings for the main scan. It should be understood that the pre-scan duration will vary from film roll to film roll because of their contents and the way in which the operator responds to set-up failures. That is, for example, if the scanning apparatus fails to detect the frame lines or the scene balance algorithm determines that some frames are not printable this would then require operator intervention and could significantly increase the pre-scan duration. This variation of the pre-scan period will result in a loss of synchronization between the scanning operation and the printing operation with each roll of film F. Completion of the pre-scan will allow the main scanning in high resolution to begin. The main scan timing diagram shows the duration for scanning 24 exposure rolls of films. As the images are scanned in high resolution, the data is sent and stored in frame store 60. The printer will normally print nine images at a time. Therefore, until nine images are scanned and stored in the frame store, no printing will take place. The high resolution, i.e., main scans, of the first and second sets of 9 images will take 18 seconds each, and the last 6 images will be scanned in 12 seconds. Once the pre-scan is completed, the remaining operations for that roll of film are determined and one can predict accurately when they will be performed.

As soon as the frame store contains data from nine images, the printing could begin. As mentioned earlier, depending on the position of the interframe area 70 of the PC Attain 20 will prevent the commencement of the exposure at that time; because exposure can occur only when the drum is in certain positions depending upon the format. The third timing chart in FIG. 8 shows the rotations of the photoconductive image member which is constantly turning at 6 seconds per revolution. The left side of each box indicates the exact moment that the imageable portion of the image member is in line with the laser exposure beam. For this reason, the data can only be read from the frame store to the output line buffer 66 and laser writer 24 at the fixed and marked positions of the PC drum. The fourth timing chart in FIG. 8 shows this printing operation of the images. The lost times resulting from this effect are shown at $T_1$, $T_2$ and $T_3$ at the bottom of FIG. 8. Time is wasted because the photoconductor drum is not the proper position for the printing to begin as soon as the sufficient number of frames have been main-second. These unproductive periods could vary in duration from zero up to one revolution of the drum which is six (6) seconds. This may not seem to be significant, but it should be understood that the period of times saved would be saved for each roll of film. Accordingly, a photofinisher that processes 200 rolls of film a day could lose up to 1200 seconds or 20 minutes a day.

Figure 9:
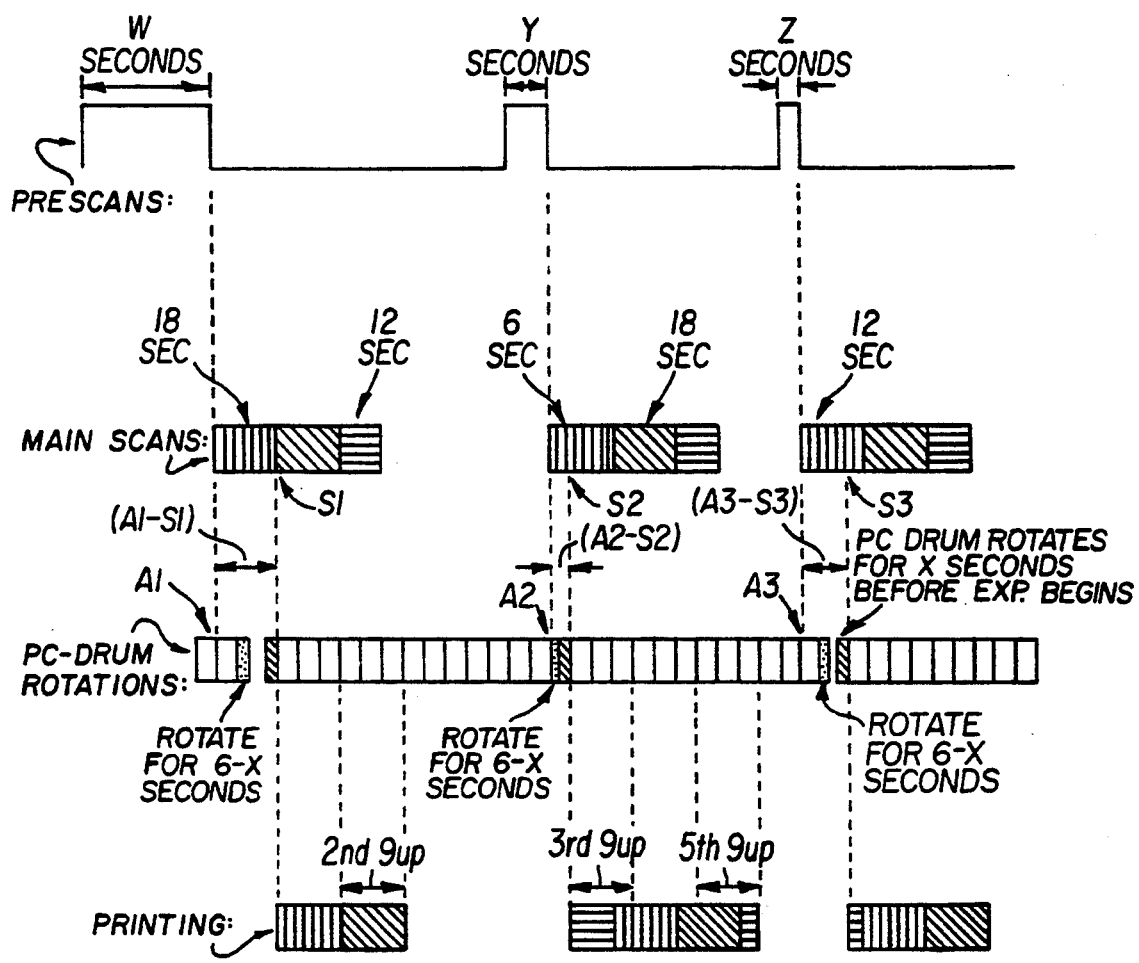
FIG. 9 is a timing diagram for a system using scanner and printer synchronization.

FIG. 9 illustrates a timing diagram for a system that synchronizes the scanner and the printer. Upon completion of the pre-scan which is performed at points $A_1$, $A_2$ and $A_3$ of FIG. 9, the image data manager 12 after the completion of the pre-scan can determine how long the main or high resolution scan will take so that it can predict when printing can begin. For example, the first roll of film requires 18 seconds for scanning because the frame store is empty and a total of nine images must be scanned. The assumption is made that each roll has 24 printable images for simplicity of argument. In practice, each roll may have a different number of printable images. This invention will apply to those cases without any modification or addition. Only three images from the second roll must be scanned before printing can begin because the last six images from the first roll of film remain in the frame store 60. Accordingly, the instances that printing can begin would be at $S_1$, $S_2$ and $S_3$ as predicted along the time line. As a result of the two pieces of information obtained above, the image data manager 12 (FIG. 1) will determine the time intervals from the end of the pre-scan to the start of printing (i.e., $A_1-S_1$, $A_2-S_2$ and $A_3-S_3$). Image data manager 12 will divide that time interval minus the period for one drum revolution of 6 seconds in this instance. The integer portion of the quotient will indicate the number of complete additional revolutions the PC drum could make before the exposure begins; this number will be N as shown by the relationship below:

$$\frac{(A-S)-6}{6} = N$$

where $A-S$ represents the time duration from A to S.

It should be noted that the drum could be in any position. Once the pre-scan is completed, the image data manager 12 will determine the position of PC drum 20 by reading an encoder count. If the encoder is reset to zero when the drum is in the start position for beginning exposure (home position) and the encoder count indicates that the home position has passed, then the number N above is decremented by one (N−1). The final N indicates how many more home positions must be sensed by the encoder before the drum is stopped. With the use of this method, the duration of the stopped position is reduced to less than 6 seconds which would be a complete revolution. This has the advantage that nonuniform heating of the drum would not be noticeable because of the short duration that the drum is stopped. It should be noted that the stopping of the drum as taught in the first embodiment is fairly easy because the operation of the drum at either a constant speed or in a stopped condition is less costly than continuously monitoring the motor speed. In FIG. 9, notice the photoconductor drum revolutions, i.e., third diagram, are not continuous. This is shown with blank areas in the sequence of 6 second boxes. However, it should be understood that controlling the speed of the drum by speeding up or slowing it down so that it arrives at its home position at the proper time would also be within the scope of this invention but the motor speed control would add considerable cost to the system.

In accordance with the preferred embodiment, once the last home position for the drum is sensed, the drum is allowed to rotate to a positive "X seconds before home" and then stopped. From this position, the drum can be moved to the exposure position within X seconds. Therefore, a timer is used that is initially loaded with "$(A_1-S_1)-X$ seconds for the first roll of film. Accordingly, the timer is started at point A1. When this timer expires, the drum begins rotation and it will be at the home position exactly when the main scan is completed.

Figure 10:
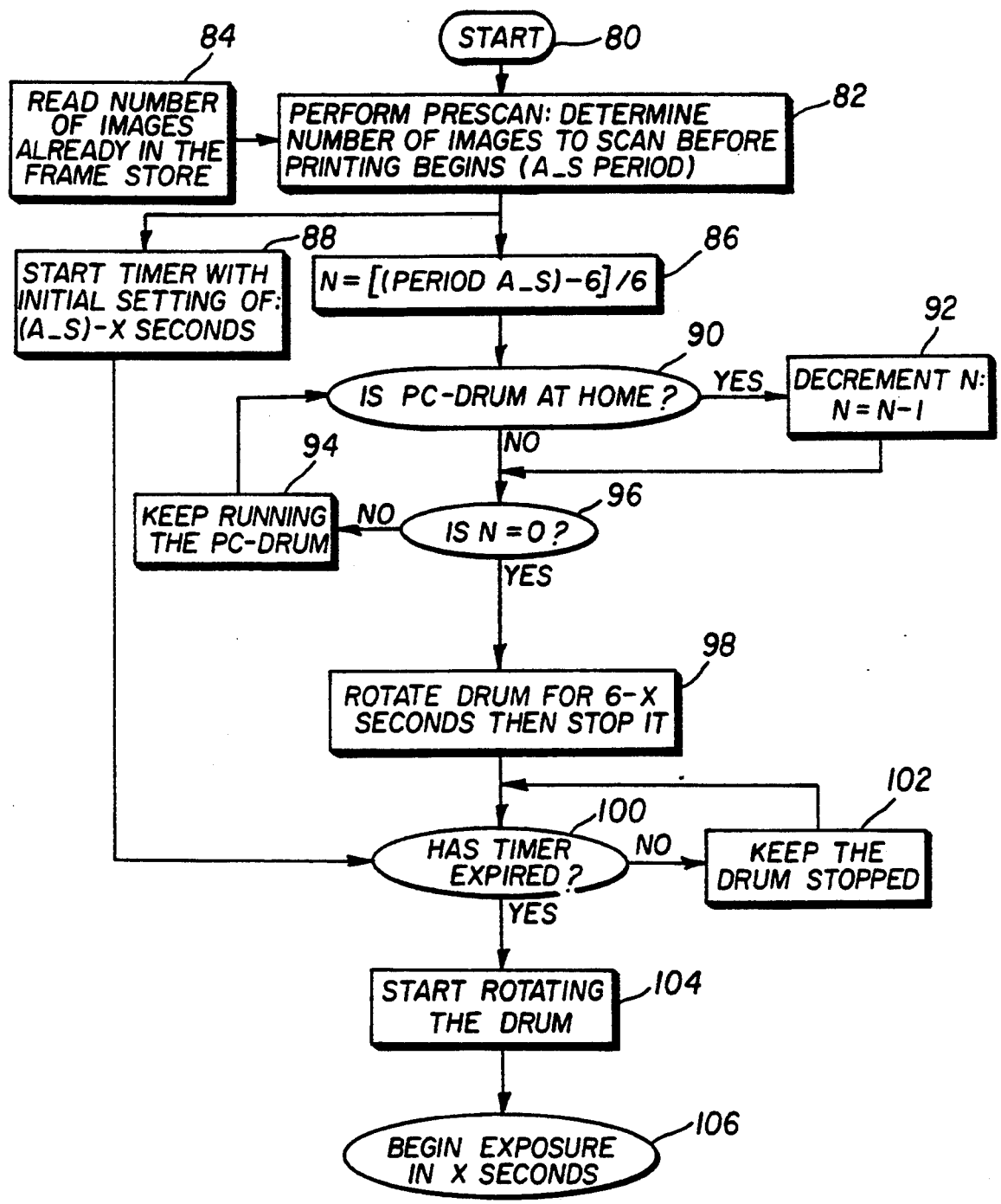
FIG. 10 is a control flow chart for an electronic color printer having synchronization between scanner and the printer.

The flow chart for printer synchronization with the scanner is shown in FIG. 10. The start of the control sequence is shown at step 80. In step 82 the pre-scan is performed to determine among other things the number of images that must be scanned by the high resolution scan before printing can occur. This is the period or interval between A and S where A is when the pre-scan ends and S being the time that printing can take place or after 9 images have been scanned by the high resolution scan. From step 84, the number of images that already reside in the frame store from earlier scans is determined.

Next, a parallel path is begun in step 88 where a timer is started with initial setting of $(A-S)-X$ seconds. Then, in step 86 a determination of the number of revolutions that must be made before the drum is stopped. In step 90, the question is asked: "is the PC drum at its home position?". If the answer to that is yes, then in accordance with step 92, where a counter is decremented to provide a new N which will be the number of times that the PC drum will rotate before it is stopped. If the PC drum were not at the home position, then there would be a move to step 96 where the question is asked: "has N been decremented to zero?". If not, then the PC drum is allowed to continue to rotate and we are directed back to step 90. This loop will continue until N has been decremented to zero. When N is zero, move to step 98 where the drum is rotated for 6-X seconds and then stopped. One complete revolution of the drum is 6 seconds in this particular configuration and X is that period of time that it takes the drum to rotate from the stopped position to the writing position (the home position) and that is approximately 2.5 seconds in this instance. In other words, the interference area on the drum will take 2.5 seconds to move from the home position past the charger and the write station so that a complete image can be placed on the interface area.

Step 100 asks another question and that is: "has the timer expired?". That timer was the timer started in step 88. If the answer is no and the timer has not expired, step 102 maintains the drum in the stopped position and will stay in that loop until the timer has expired. Moving to step 104, the PC drum is started to rotate and the exposure will begin in X seconds (in this embodiment, 2.5 seconds) in accordance with final step 106 and the frame store 60 will be full by this time and ready to provide images for writing.

The invention has been described in detail with particular reference to preferred embodiments thereof, but it will be understood that variations and modifications can be effected within the spirit and scope of the invention as set forth in the claims.

I claim:

1. An electronic color printing apparatus for printing an array of images contained on multiple image sources on a per-batch basis comprising:
    a) a movable image member having an image receiving portion and a non-image receiving portion;
    b) means for pre-scanning, an array of images contained on respective multiple image sources and providing a first signal;
    c) means for determining the position of said movable image member and generating a second signal in response thereto;
    d) means for forming images on said movable image member; and
    e) control means responsive to said first and second signals to control the position of said movable image member by selectively stopping and starting said image receiving portion so that it is positioned to receive an image from said image-forming means.

2. The electronic color printing apparatus as set forth in claim 1 wherein said image receiving member takes the form of a cylindrical drum.

3. The electronic color printing apparatus as set forth in claim 1 wherein said image receiving member takes the form of an endless belt with a photoconductive surface.

4. In an electronic color printer in which an array of images from respective frames of a filmstrip or the like is provided on print receiver sheets from information signals representing image information, said electronic printer including a photoconductive recording member, marking particle development stations for developing electrostatics latent images on such photoconductive recording member, a transfer device for transferring marking particle developed images from such photoconductive recording member to a receiver sheet, and a fusing device for fusing transferred images to such receiver sheet, a control device for producing prints from the array of images, said control device comprising:
    a) means for pre-scanning, at low resolution, an array of images contained on respective frames of a filmstrip or the like, and producing an information data stream respective thereof;
    b) means, responsive to said information data stream for storing information data, obtained during low resolution pre-scanning, of at least the number of printable images;
    c) a movable photoconductive recording image member having an image receiving portion and a non-image receiving portion;
    d) means for forming images on said movable photoconductive recording image member; and
    e) means for controlling the speed of said movable photoconductive recording image member in response to said pre-scanning information to ensure that said image receiving portion of said movable photoconductive recording image member is positioned to receive images from said image-forming means.

5. The electronic color printer as set forth in claim 4 wherein said means for controlling the speed of said movable photoconductive recording image member includes means for selectively stopping and starting said movable photoconductive recording image member that is moved at a constant speed during image formation.

6. The electronic color printer as set forth in claim 5 wherein said movable image member takes the form of a cylindrical drum.

7. The electronic color printer a set forth in claim 5 wherein said movable image member takes the form of an endless belt having a photoconductive surface.

8. The electronic color printer a set forth in claim 5 wherein said stopping of said movable photoconductive recording image member occurs only at the beginning of a batch of said printable images.

9. An electronic printing apparatus for printing an array of images contained on frames of film on a per-batch basis comprising:
    a) a movable image member having an image receiving portion and a non-image receiving portion;
    b) means for pre-scanning, an array of images contained on respective frames of film and providing a first signal;
    c) means for determining the position of said movable image member and generating a second signal in response thereto;
    d) means for forming images on said movable image member; and
    e) control means responsive to said first and second signals to control the position of said movable image member by selectively stopping and starting said image receiving portion so that it is positioned to receive an image from said image-formed means.

10. The method of increasing the productivity of an electronic color printer having movable image members having an image receiving portion and a non-image receiving portion and means for forming an image on said movable image member comprising the following steps:
    a) pre-scanning, at low resolution, an array of images contained on respective frames and providing a first signal;

b) determining the position of a movable image member and generating a second signal indicative thereof; and c) controlling the position of said movable image member so that said image receiving portion is positioned to receive an image from said image-forming means.

11. The method as set forth in claim 10 wherein the controlling of the position of the image member is accomplished by stopping said image member that moves at a constant speed.

12. The method as set forth in claim 11 wherein said stopping of said image member occurs only when starting to print a batch of color prints.

13. The method as set forth in claim 11 wherein said pre-scanning information is used to stop the image member to ensure that said image-receiving portion is positioned to receive images from said image-forming means.

14. The method of increasing the productivity of an electronic batch printer having a movable image member having an image receiving portion and a non-image receiving portion and means for forming an image on said movable image member comprising the following steps:

a) pre-scanning, an array of images contained on multiple image sources and providing a first signal;

b) determining the position of a movable image member and generating a second signal indicative thereof; and c) controlling the position of said movable image member by selectively stopping and starting so that said image receiving portion is positioned to receive an image from said image-forming means at the beginning of each batch.

15. The method as set forth in claim 14 wherein the controlling of the position of the image member is accomplished by stopping an image member that moves at a constant speed during image formation.

16. The method as set forth in claim 15 wherein said pre-scanning information is used to stop the image member to ensure that said image-receiving portion is positioned to receive images from said image-forming means for the next batch of prints.

17. The method of as set forth in claim 15 wherein the length of time the image member is stopped depends on the position of the image member when the pre-scanning is complete and when printing can begin.

* * * * *